United States Patent [19]

Moedritzer et al.

[11] 4,067,934

[45] Jan. 10, 1978

[54] CONDENSATION PRODUCTS OF PHOSPHINE OXIDES

[75] Inventors: Kurt Moedritzer, Webster Groves, Mo.; Eugene L. Ringwald, Raleigh, N.C.

[73] Assignee: Monsanto Company, St. Louis, Mo.

[21] Appl. No.: 688,514

[22] Filed: May 20, 1976

Related U.S. Application Data

[62] Division of Ser. No. 574,657, May 5, 1975, Pat. No. 3,993,623.

[51] Int. Cl.$^2$ .................................................. C07F 9/40
[52] U.S. Cl. .................................. 260/931; 260/973; 260/982
[58] Field of Search ........................................ 260/931

[56] References Cited

U.S. PATENT DOCUMENTS

| | | | |
|---|---|---|---|
| 3,042,701 | 7/1962 | Birum | 260/931 |
| 3,042,702 | 7/1962 | Birum | 260/931 |

OTHER PUBLICATIONS

Doklady Akad Nauk USSR, vol. 128, No. 1 (1959) pp. 81–84.

*Primary Examiner*—Richard L. Raymond
*Attorney, Agent, or Firm*—Herman O. Bauermeister

[57] ABSTRACT

The present invention relates to novel oligomeric and polymeric condensation products of phosphine oxides, such as bis(p-hydroxyphenyl)alkyl or aryl phosphine oxides condensed with alkyl or arylphosphonic dihalides or diphenoxides, and to processes of preparing the present novel compositions of matter. The invention also includes a process of imparting fire-retardant properties to combustible materials by treatment with the condensation products of the present invention, as well as novel compositions composed of otherwise combustible base materials such as various organic polymers for example Nylon or polyethylene terephthalate having combined therewith the present condensation products.

3 Claims, No Drawings

CONDENSATION PRODUCTS OF PHOSPHINE OXIDES

This is a division of application Ser. No. 574,657 filed May 5, 1975, now U.S. Pat. No. 3,993,623.

BACKGROUND OF THE INVENTION

The present invention relates to novel oligomeric and polymeric condensation products of phosphine oxides, such as bis(p-hydroxyphenyl)alkyl or aryl phosphine oxides condensed with alkyl or arylphosphonic dihalides or diphenoxides. The invention also relates to processes of preparing the present novel compositions of matter. Another embodiment of the invention is a process of imparting fire-retardant properties to combustible materials by treatment with the condensation products of the present invention, as well as novel compositions composed of otherwise combustible base materials such as various organic polymers for example Nylon or polyethylene terephthalate having combined therewith the present condensation products.

SUMMARY OF THE INVENTION

According to the present invention condensation products are prepared using reactants of the general types shown in the equation below, representing the reaction between a bisphenol-substituted phosphine oxide and a phosphonic dihalide or diphenoxide in the presence of a catalyst.

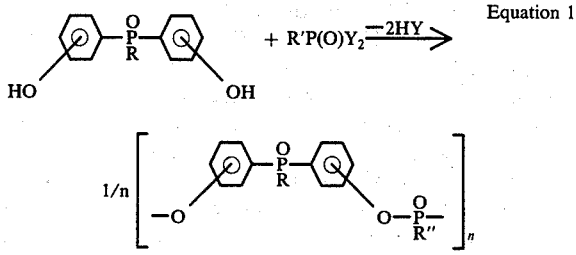

Equation 1 where R and R' are alkyl groups of 1 to 10 carbon atoms or aryl groups of 6 to 20 carbon atoms, exemplified by $CH_3$, $C_2H_5$, $C_6H_5$ or $(CH_3)C_6H_4$, and Y is Cl, Br, or an O-aryl such as $OC_6H_5$ or $OC_6H_4CH_3$, and $n$ is 1 to 100 depending on the length of heating time or fractionation by solvents, e.g. ether.

In the phosphine oxide, the OH may be at various positions on the ring which may also have other substituents present e.g. bromine or chlorine. The degree of polymerization can be controlled by conventional means such as regulation of the heating time or by fractional precipitation of the product from solvents such as ethers and diglyne. The products of the present invention are obtained with $n = 1$ to 100 for the degree of polymerization, a preferred group being $n = 2$ to 80, and still more preferably $n = 5$ to 50. The polymeric molecular structure also has end groups, e.g. an OH at the portion of the molecule remote from the phosphonate group, while at the terminal phosphonate group there may be another bisphenol which has been employed in the polymerization.

The processes for producing the condensation products of the present invention employ a bis phenol-substituted phosphine oxide as one component of the reaction. In a preferred embodiment of the invention the second component is a phosphonic dihalide such as a dichloride or dibromide. However the phosphonic component may also be a phosphonic diphenoxide, $RP(O)Y_2$ in which Y is a phenoxy or substituted phenoxy group such as $—OC_6H_5$, or $OC_6H_4(CH_3)$ or $OC_6H_3(CH_3)_2$.

In another embodiment of the invention two solvents are employed in order to provide two phases, for example water to dissolve the bis phenol-substituted phosphine oxide as the sodium compound e.g. $NaO(C_6H_4)—P(O)(CH_3)—(C_6H_4)—ONa$. An organic solvent such as methylene dichloride is used to introduce the phosphonic dihalide, such as $CH_3P(O)Cl_2$. This method is called the interfacial method since the chemical reaction takes place in the interface between the organic phase and the aqueous phase. High speed agitation such as by the use of a blender serves to provide an intimate admixture of small liquid bubbles of the respective phases and increases the interface reaction area.

The present invention is preferably conducted with the art of a catalyst. For example, when using the phosphonic dihalide component, an amine hydrochloride catalyst such as pyridine hydrochloride, quinoline hydrobromide, piperidine hydrochloride, triethylamine hydrochloride and trimethylamine hydrochloride may be employed.

When using the phosphonic diphenoxide reactant desirable catalysts include salts of tetrafluoroboric acid such as sodium tetrafluoroborate, potassium tetrafluoroborate, or magnesium tetrafluoroborate.

The compounds of the present invention are useful in fire-retardant materials. The method of testing fire-retardant properties is A.S.T.M. Designation D 2863-70, entitled "Standard Method of Test for Flammability of Plastics Using the Oxygen Index Method".

In the oxygen index (OI) testing procedure the relative flammability of a plastic material such as Nylon, or polyethylene terephthalate is determined by measuring the minimum concentration of oxygen in a slowly rising mixture of oxygen and nitrogen that will just support combustion. Consequently the oxygen index expresses such minimum concentration of oxygen, expressed as volume percent, in a mixture of oxygen and nitrogen that will just support combustion.

The test is conducted by burning the material in a test column which is a heat resistant glass tube of 75mm minimum inside diameter and 450mm minimum height. At the bottom of the tube is a bed of glass beads about 100mm deep to mix and distribute the gas mixture. Within the glass tube used as the test column there is a specimen holder to support the treated plastic material, while the apparatus is supplied with oxygen and nitrogen flow and control devices. The apparatus is also provided with an igniter which is a separate tube through which a combustible gas such as natural gas is used to ignite the test specimen: In the present testing program glass scrim supported molded sheets of Nylon or polyethylene terephthalate ca. 0.2mm thick and about 25mm by 100mm in size are used as the test specimens which were prepared from Nylon or polyethylene terephthalate powder and 1% to 20% by weight of the fire retardant additive; the data in the present work correspond to 10% by weight of additive. As a result of the molding of the organic polymer e.g. Nylon or polyethylene terephthalate, and the additive, an intimate admixture or melt of the molecules of the components is obtained.

In conducting the test, the specimen is clamped in the holder in the test column after which the desired initial concentration of oxygen is introduced to the ignited specimen. A number of tests are conducted to determine the minimum concentration of oxygen that will just support combustion.

The present condensation products are useful in combination with organic polymers generally to reduce combustibility. The normally flammable organic polymers which are rendered fire retardant in accordance with the invention may be natural or synthetic but are preferably a solid synthetic polymer, more preferably a nylon or ester type polymer. Examples of the polymer are cotton, wool, silk, paper, natural rubber, and paint, the high molecular weight homopolymers and copolymers of amides, e.g. (Nylon 66 and Nylon 6), adipamides and esters such as polyethylene terephthalate and polybutylene, and unsaturated aliphatic and aromatic hydrocarbons, e.g. ethylene, propylene, styrene etc., and acrylic polymers, e.g. polyacrylonitrile, polymethyl methacrylate, alkyl resins, cellulose derivatives e.g. cellulose acetate, methyl cellulose etc., and epoxy resins, furan resins, isocyanate resins such as polyurethanes, melamine resins, vinyl resins such as polyvinyl acetate and polyvinyl chloride, resorcinol resins, synthetic rubbers such as polyisoprene, polybutadiene-acrylonitrile copolymers, butadiene-styrene polymers, butyl rubber neoprene rubber, ABS resins and mixtures thereof: Since the compositions of the invention are unusually effective fire retardants they are normally combined with the organic polymer at relatively low concentrations e.g. about 1-20 wt.%, preferably about 3-5% based on the weight of the polymeric substrate, such as by milling, or impregnation, e.g. from a water or alcohol dispersion or solution.

DESCRIPTION OF SPECIFIC EMBODIMENTS OF THE INVENTION

The following examples illustrate specific embodiments of the invention but are not limitative of the broad scope of the invention.

EXAMPLE 1

A reaction vessel equipped with a reflux condenser is charged with 7.08 grams (0.0228 moles) of

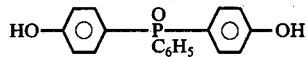

together with 0.2 grams of pyridine hydrochloride as a catalyst. The $C_6H_5POCl_2$ (4.45 grams equivalent to 0.0228 moles) is distilled directly into the reactor from a small vessel, after which the reactor is heated to 100° C while passing a stream of dry nitrogen into the reaction mixture to remove the generated HCl. During a period of 8 hours the temperature is raised to 200° C with the reaction being concluded at 200° under vacuum to remove unreacted and by-product halogen compounds.

Upon cooling, the condensation product is obtained as very light yellow, transparent, hard solid. A portion is ground to a white powder, soluble in methanol and in chloroform, but insoluble in ethyl ether. The melting point is 180° C, the melted composition being a clear and colorless viscous material which does not readily flow until a temperature of 230° C is reached.

A 4g sample of the polymeric material is purified by dissolving in chloroform from which it is separated as a white polymer upon addition of the chloroform solution to cold ether. The yield of polymer after drying in a vacuum oven is 1.5 grams. Analysis, found: C, 65.0; H, 4.10 and P, 14.3%; Calc'd: C, 66.7; H, 4.2; P, 14.3%. The average molecular weight was 1770 and the inherent viscosity was 0.1. The Oxygen Index of a polyester film containing 10% of the above polymer as additive is 24 (polyester without additive: 19).

The average molecular weight is 1770, however, when the polymeric product is subjected to fractionation such as by use of suitable solvents such as ethyl ether and others such as dioxane various molecular weight fractions are obtained.

For $n = 1$ in Equation 1, the end groups are —OH and

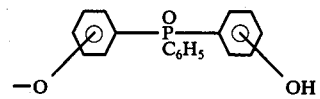

Fractionation also gives preferred ranges of products of preferred degrees of polymerization, e.g. 2 to 80, or broadly $n = 1$ to 100.

EXAMPLE 2

A reaction vessel equipped with a reflux condenser is charged with 3.65 grams (0.0147 moles) of

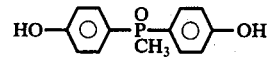

together with 0.2 grams of pyridine hydrochloride as a catalyst. The $C_6H_5POCl_2$ (2.87 grams equivalent to 0.0147 moles) is distilled directly into the reactor from a small vessel, after which the reactor is heated to 100° for 17 hours while passing a stream of dry nitrogen into the reaction mixture to remove the generated HCl. During a period of 8 hours the temperature is raised to 200° and subsequently the reaction is being concluded at 250° under vacuum to remove unreacted and by-product halogen compounds.

Upon cooling 5.2 grams of the condensation product is obtained as an off-white hard solid which upon grinding up yields a white material, which is soluble in ethanol. The melting point is in the range of 175°-210°. The polymer gave the following analysis: found: C, 60.3, H, 4.4; P, 16.2%; calc'd: C, 61.6; H, 4.4, P, 16.7%. The average molecular weight was 12230. The Oxygen Index of a polyester film containing 10% of the above polymer gave an OI of 24 (polyester without additive: 19).

EXAMPLE 3

A reaction vessel equipped with a distilling head is charged with 10.84 grams (0.0344 moles) of

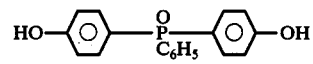

together with 0.05 grams of $NaBF_4$ as catalyst and 8.64 grams (0.0349 moles) of $CH_3PO(OC_6H_5)_2$. The reactor is heated to 200° with dry nitrogen bubbling through the reactants. During this procedure and upon subsequent heating in vacuo with the temperature gradually increasing up to 250° the stoichiometric amont of phenol is removed from the reaction vessel by distillation.

Upon cooling the condensation product is obtained as a colorless, glossy solid which grinds to a white powder which is soluble in chloroform and melts in the range from 185°–220°. Analysis gave the following results: found: C, 62.0; H, 4.8; P, 15.2%; calc'd: C, 61.6; H, 4.4; P, 16.7%. The molecular weight was 2450. The Oxygen Index of a polyester film containing 10% of the above polymer used as additive was 24 (polyester without additive: 19).

EXAMPLE 4

A Waring Blender is charged with a cold solution of 3.1 grams (0.01 moles) of

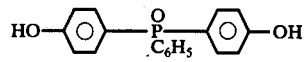

dissolved in 21 ml of 1N and NaOH and 10 mg of triphenylbenzylphosphonium chloride was added as catalyst. The blender was turned on and a solution of 1.95 grams (0.01 moles) of $C_6H_5POCl_2$ in 5 ml of dry $CH_2Cl_2$ was added quickly. The resulting polymer was separated, dissolved in $CHCl_3$ and precipitated with diethylether. After drying the material melted in the range from 70°–240°.

The polymer contained 63.7% C, 4.4% H and 12.8% P (calc'd: C, 66.7; H, 4.20; P, 14.3). The molecular weight was about 1500 and the Oxygen Index of a polyester film containing 10% of the above polymer as additive was 24 (polyester without additive: 19).

Further examples utilizing specific starting materials (R and R' of Equation 1) polymerized by the methods of Examples 1, 3 and 4 (designated in the Table as 1, 3 or 4) are summarized below. The oxygen index values for fire retardancy are based upon the use of polyethylene terephthalate, although Nylon gives similar results.

TABLE

| Ex. | REACTANTS R | R' | METHOD | MELTING POINT °C | OXYGEN index (OI) |
|---|---|---|---|---|---|
| 5 | CH₃ | CH₃ | 1 | 180–190 | 24 |
| 6 | CH₃ | CH₃ | 3 | 140–170 | 24 |
| 7 | CH₃ | CH₃ | 4 | 155–200 | 22.5 |
| 8 | CH₃ | C₆H₅ | 3 | 160–180 | 23 |
| 9 | C₆H₅ | CH₃ | 1 | 155–180 | 24 |
| 10 | C₆H₅ | C₆H₅ | 3 | 180–235 | 23 |

EXAMPLE 11

Various polymeric products are also obtained when R is an alkyl group having 1 to 10 carbon atoms in Equation 1 above: Thus the use of

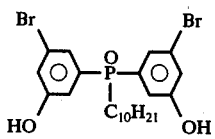

reacted with $CH_3POBr_2$ gives a high molecular weight polymer of fire retardant properties. Similarly, R' of Equation 1 can be an alkyl group having 1 to 10 carbon atoms e.g. when the starting material $C_8H_{17}P(O)Br_2$ is reacted with

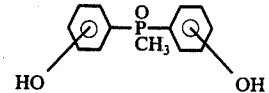

a high molecular weight product of fire retardant properties is obtained.

EXAMPLE 12

Aryl derivatives are also useful, e.g. R and R' are aryl groups of 6 to 20 carbon atoms. Thus

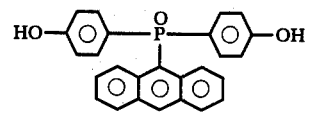

reacted with $CH_3POBr_2$ gives a high molecular weight product of fire retardant properties, also when

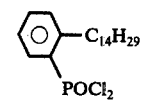

is reacted with

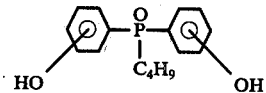

gives a high molecular weight product of fire retardant properties.

In general the compositions

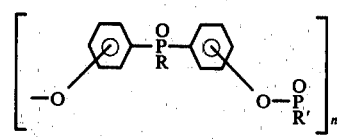

where R and R' are alkyl groups of 1 to 10 carbon atoms or aryl groups of 6 to 20 carbon atoms and $n$ is 1 to 100 are useful fire retardant materials as described above.

What is claimed is:

1. The composition

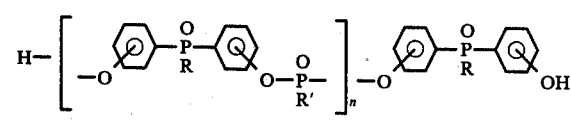

where R and R' are alkyl groups of 1 to 10 carbon atoms or aryl groups of 6 to 20 carbon atoms and $n$ is 1 to 100.

2. The composition

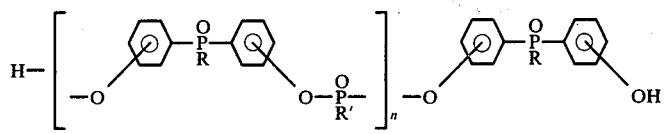
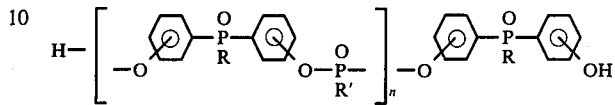
where R and R' are alkyl groups of 1 to 10 carbon atoms or aryl groups of 6 to 20 carbon atoms and $n$ is 5 to 50.
3. The composition
where R and R' are $CH_3$, $C_2H_5$, $CH_3C_6H_4$ and $n$ is 1 to 100.